US012104561B2

(12) United States Patent
Lepsch et al.

(10) Patent No.: US 12,104,561 B2
(45) Date of Patent: Oct. 1, 2024

(54) METHOD FOR MANAGING THE TEMPERATURE OF FUEL INJECTED INTO AN INTERNAL-COMBUSTION ENGINE

(71) Applicant: Robert Bosch Limitada, Campinas (BR)

(72) Inventors: Fernando Lepsch, Campinas (BR); Marcello Francisco Brunocilla, Indaiatuba (BR)

(73) Assignee: Robert Bosch Limitada, Campinas SP (BR)

( * ) Notice: Subject to any disclaimer, the term of this patent is extended or adjusted under 35 U.S.C. 154(b) by 8 days.

(21) Appl. No.: 18/029,752

(22) PCT Filed: Sep. 13, 2021

(86) PCT No.: PCT/BR2021/050390
§ 371 (c)(1),
(2) Date: Mar. 31, 2023

(87) PCT Pub. No.: WO2022/067409
PCT Pub. Date: Apr. 7, 2022

(65) Prior Publication Data
US 2023/0366366 A1 Nov. 16, 2023

(30) Foreign Application Priority Data
Oct. 1, 2020 (BR) .................... BR102020020172-7

(51) Int. Cl.
*F02M 31/125* (2006.01)

(52) U.S. Cl.
CPC ................................ *F02M 31/125* (2013.01)

(58) Field of Classification Search
CPC .................................................. F02M 31/125
USPC ........................................ 123/543, 549, 557
See application file for complete search history.

(56) References Cited

U.S. PATENT DOCUMENTS

| | | | |
|---|---|---|---|
| 8,726,893 B2 | 5/2014 | Williams et al. | |
| 2008/0098985 A1 | 5/2008 | Kamio | |
| 2022/0042483 A1 * | 2/2022 | Yamaguchi | F02N 11/0829 |

FOREIGN PATENT DOCUMENTS

| | | |
|---|---|---|
| BR | PI0902488 A2 | 4/2010 |
| WO | 2017221036 A1 | 12/2017 |
| WO | 2017221039 A1 | 12/2017 |

OTHER PUBLICATIONS

Translation of International Search Report for Application No. PCT/BR2021/050390 dated Dec. 11, 2021 (2 pages).

* cited by examiner

*Primary Examiner* — Hai H Huynh
(74) *Attorney, Agent, or Firm* — Michael Best & Friedrich LLP

(57) ABSTRACT

Method of temperature management of fuel injected in internal combustion engines (1) applicable to said system, which takes into account the measurement of the fuel flow to be injected and one or more dynamic data of the engine demand level (1) in an immediate current instant, providing accuracy in the transformation of electrical energy into heat by controlling the fuel heating temperature and, consequently, great precision in the reduction of pollutant gases, without deterioration of the vehicle's energy balance (battery).

10 Claims, 2 Drawing Sheets

METHOD FOR MANAGING THE TEMPERATURE OF FUEL INJECTED INTO AN INTERNAL-COMBUSTION ENGINE

BACKGROUND

The present invention refers to a method for controlling injected fuel temperature in combustion engines that allows the reduction of the amount of injected fuel in engines that can be propelled with either pure gasoline or ethanol or any bi-fuel blend by precisely controlling the amount of heat supplied to the fuel according to the dynamic load of the engine.

In recent years, problems with the amount of pollutants emitted (HC, CO, $CO_2$ and particulates) mainly by car engines, have been a major problem for large cities. Thus, new technologies have been developed to help reduce pollutants emitted by internal combustion engines.

In order to mitigate the emission of greenhouse gases from automobiles and reduce dependence on fossil fuels, several alternatives for replacing the internal combustion engine are available. However, the best solution to this dilemma must take into account the geographic and socio-economic characteristics of the country, its energy matrix, its emissions legislation and the environmental impact of the fuel's carbon emissions throughout its life cycle.

Brazil has a strong reputation for its fleet of bi-fuel vehicles, long experience in the use of fuel ethanol and its distribution network. This sets it apart from other global markets and justifies a unique approach to reducing aldehyde emissions, for example.

Yet, there are some limitations in the use of bi-fuel engines (popularly known as "flex" engines). To meet the demand for using two fuels in a single tank, the sizing of a flex-fuel engine tends to be intermediate, since the sizing of single-fuel engines is different, depending on the ethanol or gasoline fuel. This is because the vast majority of bi-fuel engines usually have a single geometric compression ratio, which represents the ratio between the aspirated volume plus the combustion chamber volume in relation to the combustion chamber volume).

In its course, the piston reaches a higher and a lower point in its displacement, called respectively top dead center (TDC) and bottom dead center (BDC).

Usually, the engine of a passenger vehicle has four strokes

Admission

Compression

Combustion

Escape

The effect of the compression rate is evident in the second half—the intake valves close after the injection of the air/fuel mixture and the latter is compressed so that the combustion process begins. In this way, the engine's geometric compression ratio is obtained: the ratio between the volume of the piston's combustion chamber at its bottom dead center PMI (largest volume) and its top dead center PMS (smallest volume).

Gasoline engines tend to use lower compression ratios (typically between 8:1 and 12:1), while ethanol powered engines work better with higher ratios (12:1 or even 14:1).

However, before the fuel reaches the combustion chamber, it travels a path from the vehicle's tank. This fuel is moved by a fuel pump and flows through ducts that transport the fuel—first, a hose and, later, a more rigid and branched duct called gallery. The branches take the fuel to be injected into the respective cylinders and it is at the exit of these branches where the fuel injectors are positioned.

When talking about engines that use the Otto cycle (engines traditionally used in cars), both those that use Port Fuel Injection (PFI) and those that work with Direct Injection (DI) emit particulates above of the allowed limits. Thus, the use of a particle filter for gasoline engines (whose acronym is GPF, as it comes from English—Gasoline Particulate Filter) has been recommended to comply with the new legislation on particle emissions that came into force.

However, even with the use of GPF, engines can still generate particulates above the limits determined by official health agencies, since pollutant emissions also depend on the behavior of drivers regarding the way they drive and proper vehicle maintenance.

Moreover, the impingement of fuel on the surface of the piston or on the walls of the intake ducts can contribute to the increase of emitted particles. In addition, fuel condensation in cold zones of the engine can result in incomplete combustion generating hydrocarbons and carbon monoxide (HC and CO).

That said, one of the most effective techniques to obtain a more correct burning of the fuel is to deliver it to the previously heated combustion chamber. However, it is understood that a feature that these techniques must have is the ability to manage the amount of heat used to heat the fuel so that there is a reduction in the consumption of electric energy from the battery for conversion into heat to be transferred to the fuel.

In this regard, some solutions are already known, such as the one described in patent document PI 0902488-3. This document describes a fuel heater provided for internal combustion engines having a device to determine the fuel temperature and pressure, adjust the target fuel temperature according to the fuel pressure detected by a pressure sensor and a fuel temperature control which controls the fuel heater so as to adjust the temperature sensed by a sensor to the target temperature of the fuel.

However, in the invention described in this patent document, the use of a fuel pressure sensor is mandatory, causing the target temperature to be adjusted according to the measured fuel pressure. Furthermore, the technique described in this document does not mention the need to know the temperature upstream of the heater, which makes the calculation of the power required to heat the fuel even less accurate, not satisfactorily achieving the requirement of obtaining a reduction in emissions of pollutant gases.

Another technique related to the present problem is described in Patent document WO2017/221036. Generally speaking, this invention describes a vehicle that has reduced fuel injection volumes due to fuel heating. In more detail, this document describes a vehicle with an internal combustion engine equipped with at least one heater to heat the fuel before it is delivered to the cylinder by the fuel injector; a fuel pump to supply fuel to the heater, and an electronic controller to control engine torque and fuel pressure generated by the pump, the engine controller using a model based on heating the heated engine fuel to control an amount of heated fuel supplied by the fuel injector, in order to reduce the amount of fuel injected for a given engine torque in relation to unheated fuel; and cause greater fuel pressure to be generated by the fuel pump relative to unheated fuel.

The technique disclosed in Patent document WO2017/221039 describes a system in which the control of the amount of fuel injected into the engine and the increase in fuel pressure based on a model of fuel heating in relation to the unheated model is carried out. That is, it employs a very complicated logic, which uses two injection control methods.

In this scenario, it is understood to be fundamental to control the temperature according to the engine's dynamic operating load so that heating is not provided that requires excessive and unnecessary energy to heat the fuel, and then only the appropriate amount of heat is used to heat the fuel before it is injected and none of the patent documents mentioned above discloses a technique that provides a method for managing the fuel temperature according to the dynamics of operation of the vehicle's engine, when it is in motion.

SUMMARY

Thus, the present invention proposes to solve this lack of dynamic fuel heating technique in a simplified and efficient way.

The present invention aims to provide a method of managing the injected fuel temperature in internal combustion engines applicable to said system, which takes into account the measurement of the fuel flow to be injected and one or more dynamic data of the level demand of the engine in an immediate current instant, providing accuracy in the transformation of electrical energy into heat by controlling the fuel heating temperature and, consequently, a great precision in the reduction of pollutant gases, without deterioration of the energy balance of the vehicle (battery).

In order to solve the technical problem presented and overcome the drawbacks of the state of the art, the present invention aims to provide a method of managing the temperature of injected fuel in internal combustion engines from a mixture of an air flow and fuel applicable to a vehicle, said engines equipped with

- at least one line for transporting fuel that carries a quantity of at least one fuel to be injected;
- at least one fuel heating device with a heating chamber;
- at least one fuel heating control device associated with an electronic control device and associated with at least one fuel heating device;
- said method being characterized by the fact that it comprises the stages of
- reading at least one vehicle parameter and an injected fuel flow value in a first instant;
- reading at least one vehicle parameter and an injected fuel flow value at a current time after the first time;
- determining the fuel flow gradient at the current instant;
- determining an amount of energy required for the fuel to reach a target fuel temperature value at the current time, according to the fuel flow gradient at the current time;
- performing an action between supplying and withdrawing the amount of energy necessary for the injected fuel to reach the target temperature;
- carrying out the mixing of the air and fuel flow;
- checking heated fuel temperature against current target temperature;
- performing an action.

DETAILED DESCRIPTION

Figure 1:
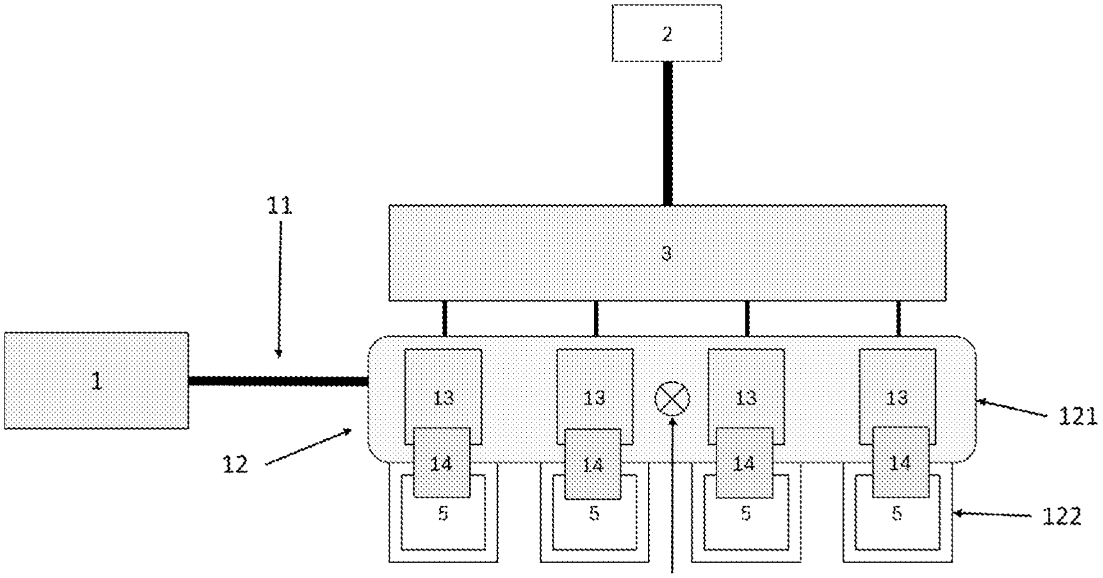
FIG. 1—Scheme of an embodiment of the fuel heating system.
Figure 2:
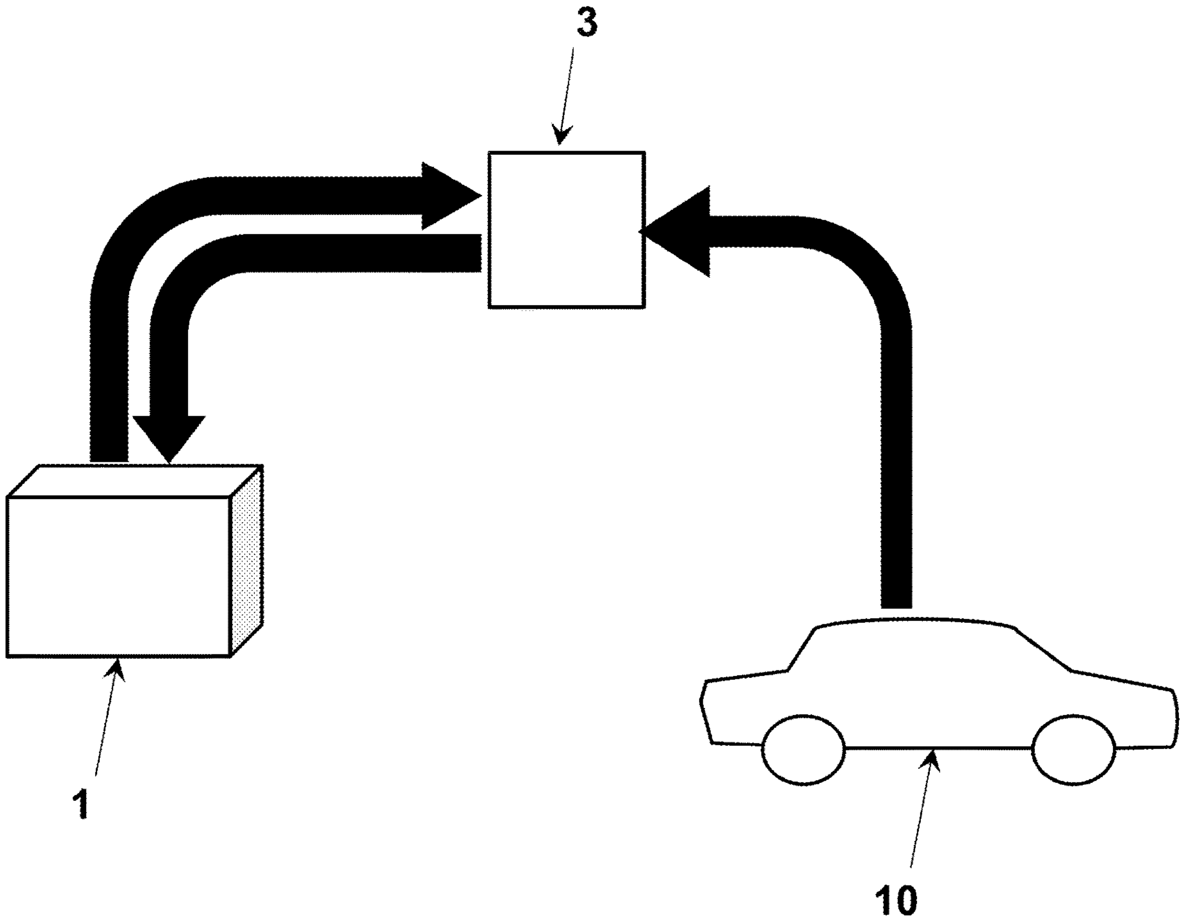
FIG. 2—Diagram of the injected fuel temperature management method.

The fuel heating and heating management system is responsible for heating the fuel that will be injected into the engine to a predetermined temperature. Fuel heating aims to improve the atomization of the injected fuel spray, reducing its droplet size, which means better preparation of the air-fuel mixture, leading to a more homogeneous mixture, which will result in a decrease in the amount of fuel injected and thus reducing the amount of gases and particulates emitted.

The operation of the heating system takes place from the start of the engine. System management aims to keep the temperature of the injected fuel always at the target temperature. For this, the system determines the amount of energy that must be supplied to the fuel, based on the fuel inlet temperature in the gallery, the fuel flow rate and the type of fuel.

Thus, the present invention describes a method of managing the temperature of fuel injected into internal combustion engines from a mixture of an air flow and fuel applicable to a vehicle, said engines equipped with at least one line for transporting fuel 11 that carries a quantity of at least one fuel to be injected;

- at least one fuel heater device 13 provided with a heating chamber;
- at least one fuel heating control device 3 associated with an electronic control device 2 and associated with at least one fuel heating device 13;
- said method comprising the steps of reading at least one vehicle parameter 10 and an injected fuel flow value in a first instant;
- reading at least one vehicle parameter 10 and an injected fuel flow value at a current time after the first time;
- determining the fuel flow gradient at the current instant;
- determining an amount of energy required for the fuel to reach a target fuel temperature value at the current time, according to the fuel flow gradient at the current time;
- performing an action between supplying and withdrawing the amount of energy necessary for the injected fuel to reach the target temperature;
- carrying out the mixing of the air and fuel flow;
- checking heated fuel temperature against current target temperature;
- performing an action.

As this invention is applicable to engines that already have systems that heat the fuel that is injected. Thus, in order to make the present invention feasible and achieve the proposed objectives, it is essential to have knowledge of the fuel flow gradient.

The flow gradient is the amount of fuel more or less that engine 1 must demand to perform a certain activity within the route being covered at that moment. For example, the additional amount of fuel that engine 1 will require to overcome a slope or a ramp, when overtaking, or the reduction in fuel demand to go down a slope or a declivity.

The determination of the amount of energy required for the fuel to reach a target fuel temperature value at the current instant, according to the fuel flow gradient at the current instant must be performed by a parameter processing control unit of the vehicle 10, which is primarily responsible for the intelligence of engine 1 as a whole. This control unit 3 can comprise either the ECU (Electronic Control Unit—responsible for electronically managing all engine operation) already present in the vehicle, or an exclusive and dedicated unit 2 just for the fuel heating system.

A vehicle parameter to be considered in this method is understood to be any data or signal captured by any sensor, microcontroller (or other device) referring to the load or demand to which engine 1 is being subjected while the driver is driving.

The method that describes the present invention presents a new and innovative technical effect because the heater device 13 receives information related to the amount of energy to be applied to the fuel with regard to the fuel gradient and performs this action of supplying or withdrawing this energy differential, according to the engine's dynamic load at that instant, before engine 1 has received the air mass corresponding to the fuel gradient and created the air-fuel mixture, responsible for the explosion.

Thus, the present invention describes, in one of its embodiments, a method of managing the injected fuel temperature in internal combustion engines, wherein the vehicle parameter 10 comprises at least one parameter sent from at least one associated device to an airflow control device. This device comprises, preferably, a throttle body (also known as "throttle body"), responsible for controlling the air flow (air mass) and/or pressure to be used during fuel injection, causing the explosion that moves the engine 1.

Therefore, the present invention contemplates a method of managing the injected fuel temperature in internal combustion engines, so that the vehicle parameter 10 comprises at least one air flow parameter. This parameter may comprise one or more signals that detect the air mass being admitted by the throttle body.

In an alternative embodiment, the present invention discloses a method of managing the injected fuel temperature in internal combustion engines, wherein the vehicle parameter 10 comprises at least one parameter sent from a device that performs vehicle acceleration. Preferably, this device comprises an accelerator pedal, lever or any other means whereby the driver informs engine 1 of the need to accelerate, decelerate or maintain constant vehicle speed.

Also alternatively, the present invention describes a method of managing the injected fuel temperature in internal combustion engines, so that the vehicle parameter 10 comprises at least one vehicle acceleration parameter. This parameter can be collected from an acceleration sensor (accelerometer or G-sensor) installed somewhere in the vehicle.

The present invention also describes a method of managing the injected fuel temperature in internal combustion engines, so that the vehicle parameter 10 comprises at least one vehicle speed parameter, already available.

In yet another alternative embodiment, the invention describes a method of managing the injected fuel temperature in internal combustion engines, so that the vehicle parameter 10 comprises at least one parameter sent from at least one device associated with the yaw movement. The present invention also contemplates a method of managing the injected fuel temperature in internal combustion engines, so that the parameter of the vehicle 10 comprises at least one parameter sent from at least one device associated with the pitching movement.

These devices responsible for detecting yaw (steering, curve) and pitch (climbing and descending) comprise, preferably, sensors that can be installed separately on the vehicle and can operate individually or in combination, in order to bring greater accuracy in terms of to the dynamic load of engine 1, transferring the minimum electrical energy necessary to heat the fuel, according to the pre-established target temperature.

In addition, the present invention contemplates a method of managing the injected fuel temperature in internal combustion engines, so that the vehicle parameter 10 comprises at least one parameter sent from at least one device associated with the overall position of the vehicle. This device comprises, preferably, a GPS (Global Positioning System), capable of identifying the exact location of the vehicle and knowing whether it is in an uphill or downhill region.

In yet another alternative embodiment, the present invention discloses a method of temperature management of injected fuel in internal combustion engines, wherein the step of performing an action comprises an action between remaining providing energy, remaining withdrawing energy and stopping the supply power.

All the devices listed above to capture and read at least one parameter of the vehicle 10 can be assembled and used individually, or they can be installed in combination two by two or multiple ways, with no limitation foreseen in the individual quantity or in the possible combinations between them, always with the objective of transferring the minimum electrical energy necessary to heat the fuel, according to the pre-established target temperature.

Thus, it should be noted that, as described above, the present invention achieves the objective of providing a method for managing the injected fuel temperature in internal combustion engines applicable to said system, which takes into consideration the measurement of fuel flow to be injected and one or more dynamic data of the engine demand level in an immediate current instant, providing accuracy in the transformation of electrical energy into heat by controlling the fuel heating temperature and, consequently, great precision in reducing pollutant gases, without deteriorating the energy balance of the vehicle (battery).

Therefore, the present invention also fulfills the role of enabling the increase of power extracted from the engine associated with lower fuel consumption and consequent reduction of pollutant gases by the engines.

The invention claimed is:

1. A method of managing the temperature of fuel injected into internal combustion engines from a mixture of an air flow and fuel applicable to a vehicle, said engines having at least one line for transporting fuel (11) which carries a quantity of at least one fuel to be injected;

at least one fuel heater device (13) provided with a heating chamber;

at least one fuel heating control device (3) associated with an electronic control device (2) and associated with the at least one fuel heater device (13);

said method comprising:

reading at least one vehicle parameter (10) and an injected fuel flow value in a first instant;

reading at least one vehicle parameter (10) and an injected fuel flow value in a current instant after the first instant;

determining the fuel flow gradient at the current instant;

determining an amount of energy required for the fuel to reach a target fuel temperature value at the current instant, according to the fuel flow gradient at the current instant;

performing an action between supplying and withdrawing the amount of energy necessary for the injected fuel to reach the target fuel temperature;

carrying out the mixing of the air and fuel flow;

checking heated fuel temperature against current target temperature;

performing an action.

2. The method of managing the injected fuel temperature in internal combustion engines, according to claim 1, wherein the vehicle parameter (10) comprises at least one parameter sent from at least one device associated with an air flow control device.

3. The method of managing injected fuel temperature in internal combustion engines, according to claim 1, wherein the vehicle parameter (10) comprises at least one air flow parameter.

4. The method of managing the injected fuel temperature in internal combustion engines, according to claim 1, wherein the vehicle parameter (10) comprises at least one parameter sent from a device that performs vehicle acceleration.

5. The method of managing the temperature of injected fuel in internal combustion engines, according to claim 4, wherein the device that performs the acceleration of the vehicle comprises an accelerator pedal.

6. The method of managing the injected fuel temperature in internal combustion engines, according to claim 1, wherein the vehicle parameter (10) comprises at least one vehicle acceleration parameter.

7. The method of managing the injected fuel temperature in internal combustion engines, according to claim 1, wherein the vehicle parameter (10) comprises at least one parameter sent from at least one associated device at vehicle speed.

8. The method of managing the injected fuel temperature in internal combustion engines, according to claim 1, wherein the vehicle parameter (10) comprises at least one parameter sent from at least one associated device to a pitching motion.

9. The method of managing the injected fuel temperature in internal combustion engines, according to claim 1, wherein the vehicle parameter (10) comprises at least one parameter sent from at least one device associated with a global position of the vehicle.

10. The method of managing the temperature of fuel injected into internal combustion engines, according to claim 1, wherein the step of executing an action comprises an action between providing energy, withdrawing energy and interrupting a supply power.

* * * * *